United States Patent
Luvisotto et al.

(10) Patent No.: US 8,056,231 B2
(45) Date of Patent: *Nov. 15, 2011

(54) METHOD OF CONSTRUCTING HEAT EXCHANGER WITH SNAP-IN BAFFLE INSERT

(75) Inventors: Eric Luvisotto, Mississauga (CA); Yuri Peric, Oakville (CA)

(73) Assignee: Dana Canada Corporation, Oakville (CA)

( * ) Notice: Subject to any disclaimer, the term of this patent is extended or adjusted under 35 U.S.C. 154(b) by 1018 days.

This patent is subject to a terminal disclaimer.

(21) Appl. No.: 11/923,164

(22) Filed: Oct. 24, 2007

(65) Prior Publication Data

US 2008/0104841 A1    May 8, 2008

Related U.S. Application Data

(62) Division of application No. 11/110,288, filed on Apr. 20, 2005, now Pat. No. 7,306,030.

(51) Int. Cl.
*B21D 39/00* (2006.01)
*B21D 51/38* (2006.01)
*B21D 53/02* (2006.01)
*F16K 15/14* (2006.01)
*F16K 43/00* (2006.01)

(52) U.S. Cl. .............. 29/890.052; 29/890.03; 29/522.1; 137/15.18; 137/852; 165/280; 165/284; 165/297

(58) Field of Classification Search .............. 29/890.03, 29/890.052, 522.1; 137/15.18–15.19, 15.21, 137/515.5, 852, 855; 165/167, 280, 284, 165/297

See application file for complete search history.

(56) References Cited

U.S. PATENT DOCUMENTS

| | | | |
|---|---|---|---|
| 1,690,501 A | 11/1928 | Potts | |
| 1,860,163 A | 5/1932 | Wyzenbeek | |
| 2,698,063 A | 12/1954 | Brubaker | |
| 2,826,448 A | 3/1958 | Jones | |
| 3,269,582 A * | 8/1966 | Knocke | 220/305 |
| 3,289,693 A * | 12/1966 | Scaramucci | 137/858 |
| 3,568,712 A | 3/1971 | Rinehart | |
| 3,621,868 A | 11/1971 | Wise | |
| 3,903,922 A * | 9/1975 | Buckman | 137/852 |
| 3,949,716 A | 4/1976 | Liu | |
| 3,998,243 A | 12/1976 | Osterkorn et al. | |
| 3,998,571 A | 12/1976 | Falke | |
| 4,193,442 A | 3/1980 | Vian | |
| 4,199,309 A | 4/1980 | Connor | |
| 4,337,737 A | 7/1982 | Pechner | |
| 4,360,055 A | 11/1982 | Frost | |
| 4,425,067 A | 1/1984 | Krezak | |
| 4,471,804 A | 9/1984 | Bauer et al. | |
| 4,561,494 A | 12/1985 | Frost | |

(Continued)

FOREIGN PATENT DOCUMENTS

CA            1005319       2/1977

(Continued)

*Primary Examiner* — David Bryant
*Assistant Examiner* — Alexander P Taousakis
(74) *Attorney, Agent, or Firm* — Marshall & Melhorn LLC

(57) ABSTRACT

An insert snaps into position in a manifold of a fluid device to perform a baffling function. The insert includes a cradle having a base portion and opposed spring fingers for retaining the insert in position. The base portion can be completely closed to prevent flow through the insert, or have a spring flapper valve or bimetallic flapper valve to permit partial or full flow through the insert under predetermined conditions.

9 Claims, 7 Drawing Sheets

U.S. PATENT DOCUMENTS

| | | | |
|---|---|---|---|
| 4,669,532 A | 6/1987 | Tejima et al. | |
| 5,038,470 A * | 8/1991 | Dierbeck | 29/890.03 |
| 5,078,209 A | 1/1992 | Kerkman et al. | |
| 5,146,980 A | 9/1992 | Le Gauyer | |
| 5,174,504 A | 12/1992 | Halvorsen | |
| 5,236,043 A | 8/1993 | Armbruster | |
| 5,266,016 A | 11/1993 | Kandpal | |
| 5,273,385 A | 12/1993 | Rose | |
| 5,351,664 A | 10/1994 | Rotter et al. | |
| 5,411,057 A | 5/1995 | Pouchot | |
| 5,499,675 A | 3/1996 | Haasch et al. | |
| 5,544,699 A | 8/1996 | Robers et al. | |
| 5,558,346 A | 9/1996 | Hartery | |
| 5,575,329 A | 11/1996 | So et al. | |
| 5,588,485 A | 12/1996 | Gire | |
| 5,595,214 A | 1/1997 | Shaffer et al. | |
| 5,609,476 A | 3/1997 | Kim et al. | |
| 5,765,632 A | 6/1998 | Gire | |
| 5,799,396 A * | 9/1998 | Bosch et al. | 29/890.052 |
| 5,921,273 A | 7/1999 | Ono et al. | |
| 6,139,291 A | 10/2000 | Perevozchikov | |
| 6,293,774 B1 | 9/2001 | Brabek | |
| 6,298,910 B1 | 10/2001 | Komoda et al. | |
| 6,358,024 B1 | 3/2002 | Djordjevic | |
| 6,360,818 B1 * | 3/2002 | Bosch et al. | 165/174 |
| 6,382,305 B1 | 5/2002 | Sano | |
| 6,412,514 B1 | 7/2002 | Raftis | |
| 6,427,768 B2 | 8/2002 | Komoda et al. | |
| 6,460,613 B2 | 10/2002 | Nash et al. | |
| 6,461,126 B1 | 10/2002 | Pierobon | |
| 6,471,490 B2 | 10/2002 | Kimura et al. | |
| 6,814,133 B2 | 11/2004 | Yamaguchi | |
| 6,942,472 B2 | 9/2005 | Sieberg | |
| 2003/0019620 A1 | 1/2003 | Pineo et al. | |
| 2006/0102240 A1 | 5/2006 | Spiegl et al. | |
| 2006/0237077 A1 | 10/2006 | Peric et al. | |
| 2006/0237079 A1 | 10/2006 | Cheadle et al. | |
| 2006/0237183 A1 | 10/2006 | Peric et al. | |
| 2006/0237184 A1 | 10/2006 | Peric | |
| 2006/0237185 A1 | 10/2006 | Peric | |
| 2008/0110605 A1 | 5/2008 | Richter | |

FOREIGN PATENT DOCUMENTS

| | | |
|---|---|---|
| CA | 1102210 | 6/1981 |
| CA | 1122968 | 5/1982 |
| GB | 1 545 710 | 5/1979 |
| WO | WO 2005/048890 | 6/2005 |

* cited by examiner

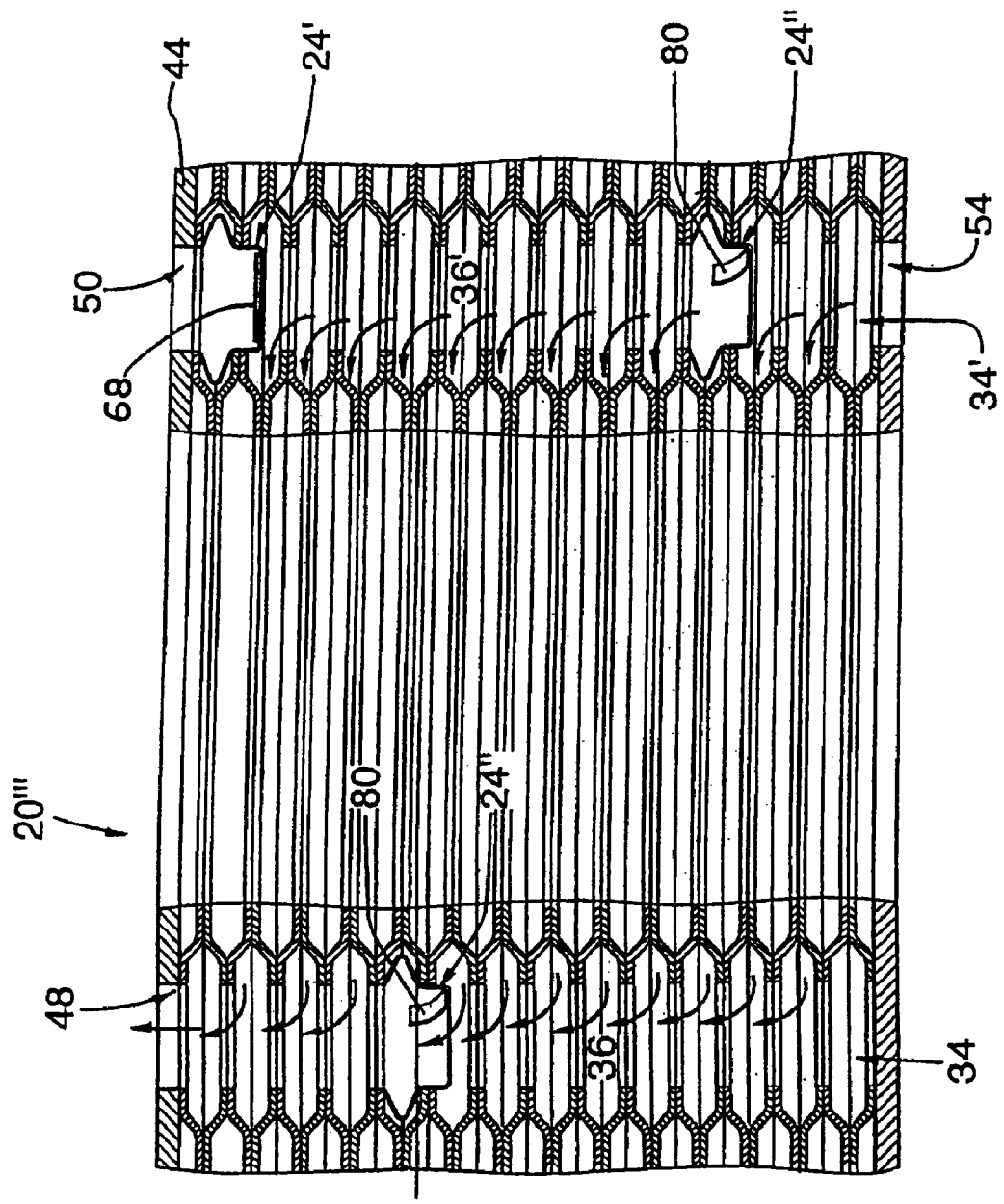

METHOD OF CONSTRUCTING HEAT EXCHANGER WITH SNAP-IN BAFFLE INSERT

RELATED APPLICATIONS

This application is a divisional of U.S. application Ser. No. 11/110,288 filed Apr. 20, 2005, now U.S. Pat. No. 7,306,030, which is hereby incorporated by reference as though fully set forth herein.

FIELD OF THE INVENTION

This invention relates to flow-circuiting in fluid devices such as heat exchangers.

BACKGROUND OF THE INVENTION

Heat exchangers are commonly used to remove heat from fluids. In the context of the automotive field, for example, it is well-known to use heat exchangers as oil coolers, to transfer heat from engine oil or transmission fluid to engine coolant.

One known type of oil cooler is constructed from a stack of thin-gauge metal plates. The plates are formed such that, in the stack, interstices are formed, the plates and interstices being disposed in alternating relation. The interstices define a plurality of oil passages and a plurality of coolant passages. The oil passages and the coolant passages are disposed in the stack in alternating relation. Thus, each plate separates a respective oil passage from a respective coolant passage, thereby to conduct heat between any contents of the oil passage and any contents of the coolant passage when a temperature differential exists therebetween. The oil passages are coupled to one another in parallel to provide an oil flow path, and the coolant passages are coupled to one another in parallel to provide a coolant flow path. Thus, when a flow of relatively hot oil is delivered to the oil flow path and a flow of relatively cold coolant is delivered to the coolant flow path, a flow of relatively cool oil and a flow of relatively warm coolant results.

As is well known, the heat transfer efficiencies of such structures is a function of the temperature differential between the fluid inlet and outlet, and the relative direction of flow of the fluids passing through the structures.

Normally, it is necessary to manufacture a variety of heat exchangers of varied dimensions to provide heat transfer performance suitable for a particular application in which it is to be employed. However, this necessitates relatively short production runs, which has an associated cost. As well, flexibility for a given application demands that a variety of heat exchangers be on hand, which has an associated inventory cost. Modern manufacturing is very cost-sensitive, and as such, these costs are disadvantageous.

In United States Patent Application Publication No. US 2002/0129926 A1, (Yamaguchi), published Sep. 19, 2002, it is taught to divide the plurality of oil passages into three groups; connect the oil passages of each group in parallel to form a respective oil flow subpath; and connect the oil flow subpaths in series. This provides a heat exchanger wherein the oil path is three times the length and one third the width than that of a heat exchanger of otherwise identical structure wherein all of the oil passages are connected in parallel, and which therefor has heat exchange characteristics differing therefrom. In this reference, which employs a plurality of plates including apertures for forming manifolds for oil and coolant, such separation is attained by omitting the openings in selected plates. This structure arguably overcomes in part the problem of short production runs, since a variety of heat exchangers can be provided simply by altering the number and position of the plates in which openings are omitted. However, this structure does not overcome the problem of inventory cost associated with flexibility.

SUMMARY OF THE INVENTION

In the present invention, an insert is provided. The insert can be snap-fit into place anywhere desired in a fluid device manifold to perform a flow baffling function. This permits a variety of heat exchangers of varying performance characteristics to be readily constructed from a single inventory of basic heat exchange elements, thereby reducing the costs of flexibility and inventory associated with devices of the prior art.

According to one aspect of the invention there is provided an insert for use with a fluid device having a flow distribution passage defined by a peripheral wall formed with opposed recesses therein. The insert comprises a cradle dimensioned to be slidably located in the flow distribution passage to block flow through the flow distribution passage. The cradle has opposed, resilient, outwardly disposed fingers adapted to engage the opposed recesses and retain the insert at an operative position in the flow distribution passage to perform a flow baffling function in use.

According to another aspect of the invention, there is provided a heat exchanger for use with a heat exchange fluid. The heat exchanger comprises a heat exchange element including: a pair of manifolds; and a plurality of heat exchange flow passages extending between the manifolds for the passage of heat exchange fluid through the heat exchange element. One of the manifolds has a flow distribution passage defined by a peripheral wall formed with opposed recesses therein. An insert includes a cradle that is dimensioned to be slidably located in the flow distribution passage in an operative position to block flow through the flow distribution passage. The cradle has opposed, resilient, outwardly disposed fingers engaged in the opposed recesses to retain the insert in the operative position.

Advantages, features and characteristics of the present invention, as well as methods of operation and functions of the related elements of the structure, and the combination of parts and economies of manufacture, will become apparent upon consideration of the following detailed description with reference to the accompanying drawings. A brief description of the drawings follows.

BRIEF DESCRIPTION OF THE DRAWINGS

FIG. 8 is a view, similar to FIG. 2, of a heat exchanger according to a sixth preferred embodiment of the present invention.

DESCRIPTION OF THE PREFERRED EMBODIMENTS

Figure 1:
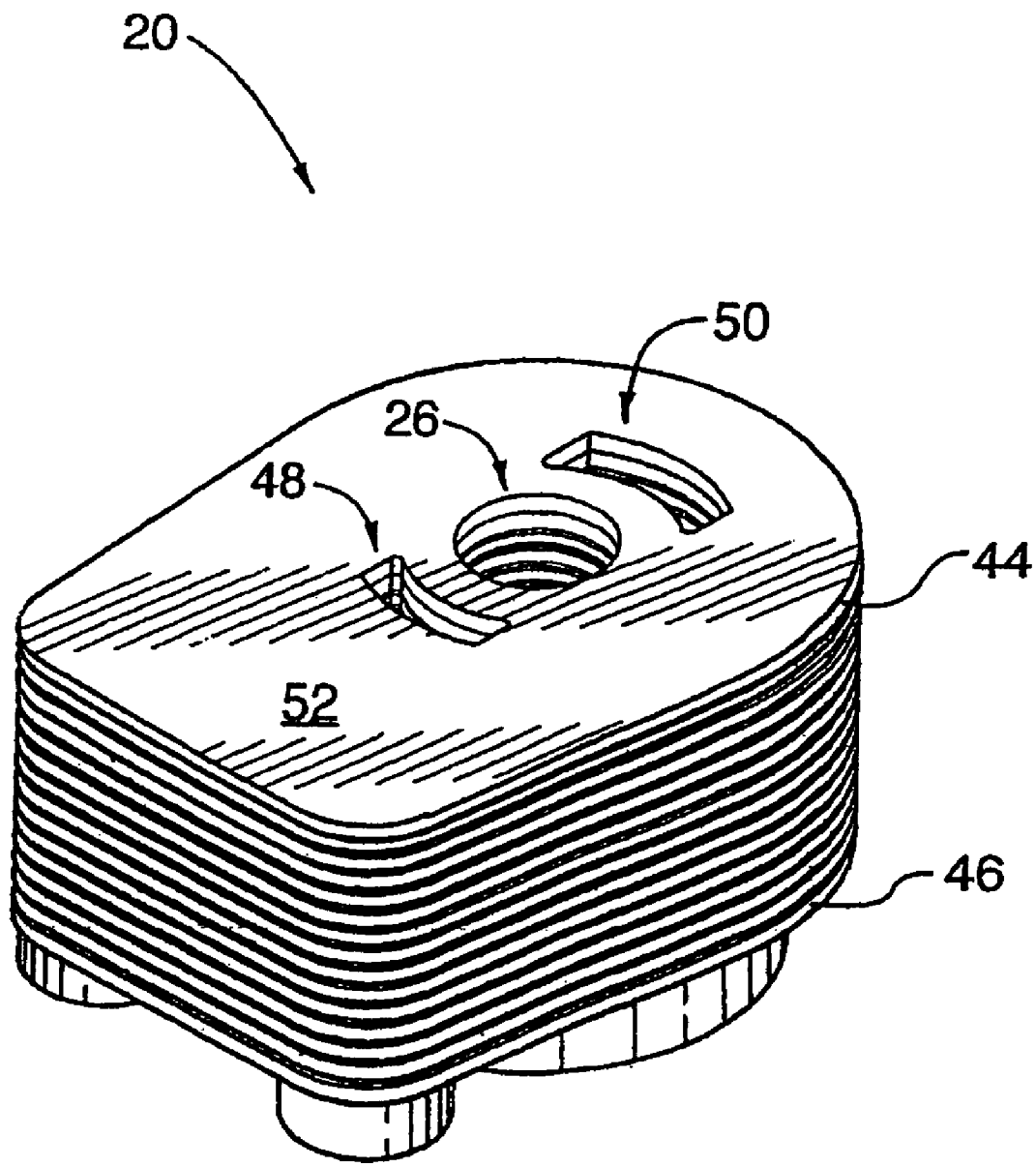
FIG. 1 is a perspective view of a heat exchanger according to a first preferred embodiment of the present invention.

FIG. 1 shows a heat exchanger 20 according to a first preferred embodiment of the present invention.

Figure 2:
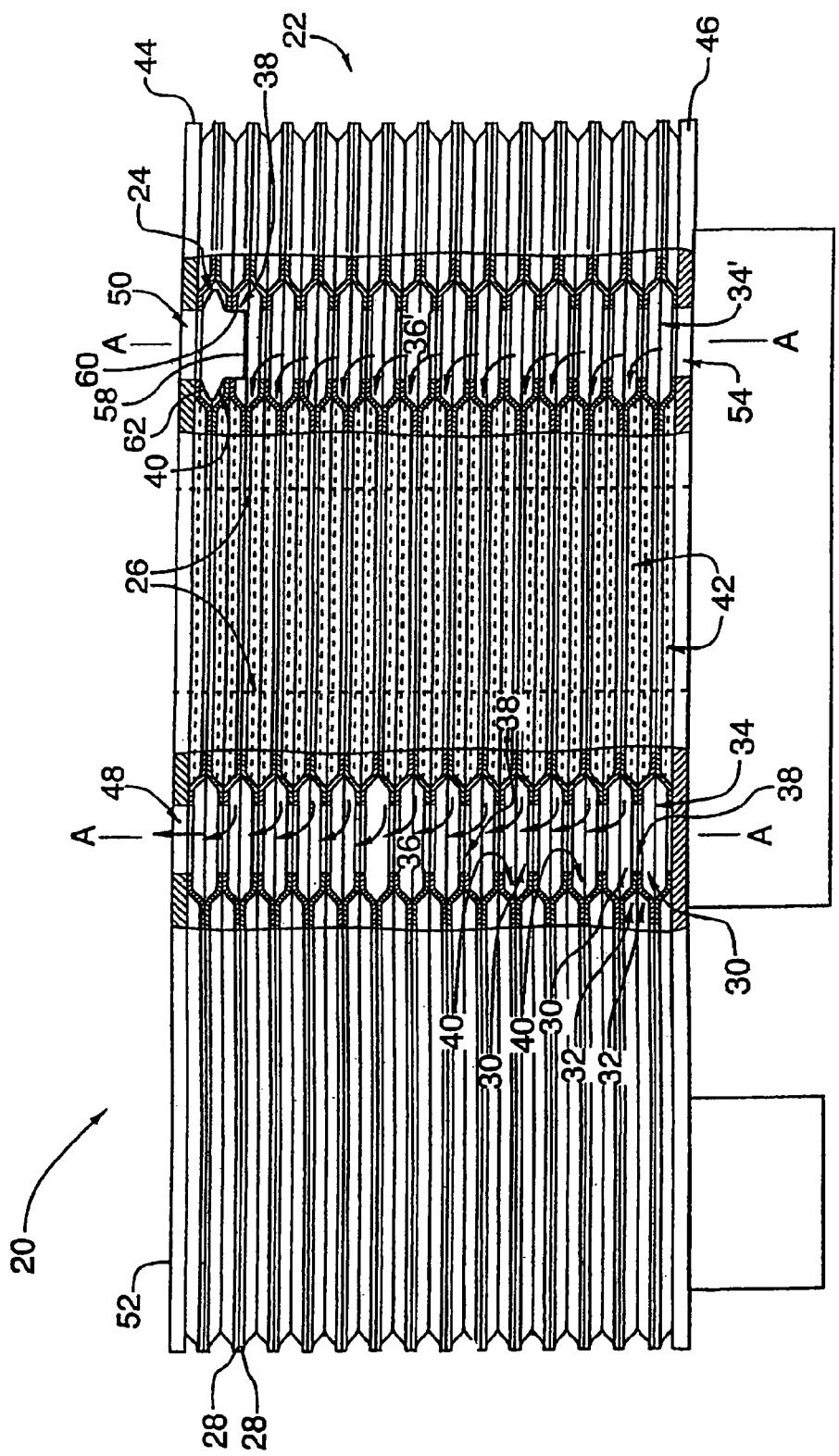
FIG. 2 is a side, partially cut-away view of the heat exchanger of FIG. 1.

FIG. 2 is a side, partially cut-away view of the heat exchanger 20 of FIG. 1. From FIG. 2, it can be seen that the heat exchanger 20 comprises a fluid device in the form of a heat exchange element 22. The heat exchanger 20 also comprises an insert 24.

The heat exchange element 22 is for use as part of a coolant circuit (not shown) and as part of an oil circuit (not shown) and is of the donut type. That is, it includes a central aperture 26 (delineated in phantom outline in FIG. 2), to permit mounting on a threaded pipe attached to an engine block (neither shown). This permits the subsequent threaded engagement of an oil filter (also not shown) onto the pipe, to hold the heat exchange element 22 in place against the engine block. It should be understood that other configurations are possible. For example, the heat exchange element need not be of the donut type. As well, the heat exchange element could be an air-cooled radiator, in which event a liquid coolant circuit would not be involved therewith in use. Further, the heat exchange element could be used for cooling or heating fluids other than oil. Additionally, the heat exchange element could be for use as part of multiple heating or cooling circuits and/or multiple oil circuits.

Preferably, the heat exchange element 22 is of the stacked-plate type, comprising a plurality of plates 28 of aluminum, brazed to one another. The plates are arranged back-to-back into plate pairs. The plates 28 have apertures 30 formed therein. The apertures 30 are ringed or encircled by raised bosses 32, and when the plates 28 are stacked against one another into the plate pairs, the bosses are opposite facing with the apertures 30 and the bosses 32 aligned. The bosses 32 thus form a pair of spaced-apart manifolds 34,34' which each define a respective flow distribution passage 36,36'.

Each manifold 34,34' has a respective central, longitudinal axis A-A. The peripheral edges of apertures 30 in abutting bosses 32 define a plurality of axially or spaced-apart annular ridges 38 projecting into the flow distribution passages 36,36'. The annular ridges 38, in turn, define therebetween a plurality of axially or longitudinally spaced-apart annular recesses or channels 40, which also form parts of the flow distribution passages 36,36'. The bosses 32 form peripheral walls of the manifolds 34,34'. The manifolds 34,34' are coupled to one another in heat exchanging relation such that, in use, upon a flow of heated oil being forced into one of the manifolds 34,34', a flow of cooled oil issues from the other of the manifolds 34,34'. Such coupling is effected in this embodiment by a plurality of heat exchange fluid flow passages or oil passages, shown in phantom in FIG. 2 and identified with reference numerals 42, formed by the plate pairs. For greater clarity, it should be understood that in this preferred embodiment, the heat exchange flow passages 42 extend between the manifolds 34,34' encircling the central aperture 26 in a split flow configuration. Again, other configurations are possible.

With continuing reference to FIG. 2, the donut cooler 20 also comprises a top plate 44 and a bottom plate 46. The top plate 44 has ports 48,50 formed therethrough communicating with respective upper ends of manifolds 34,34', and includes a flat surface 52 for sealingly receiving the base of an oil filter. The bottom plate 46 has a single port 54 therethrough which communicates with the bottom end of manifold 34'.

It should be understood that the heat exchange element 22 is of generally conventional construction, and therefore, only those parts necessary for an understanding of the present invention are shown in the figures and/or described hereinbefore.

Figure 3:
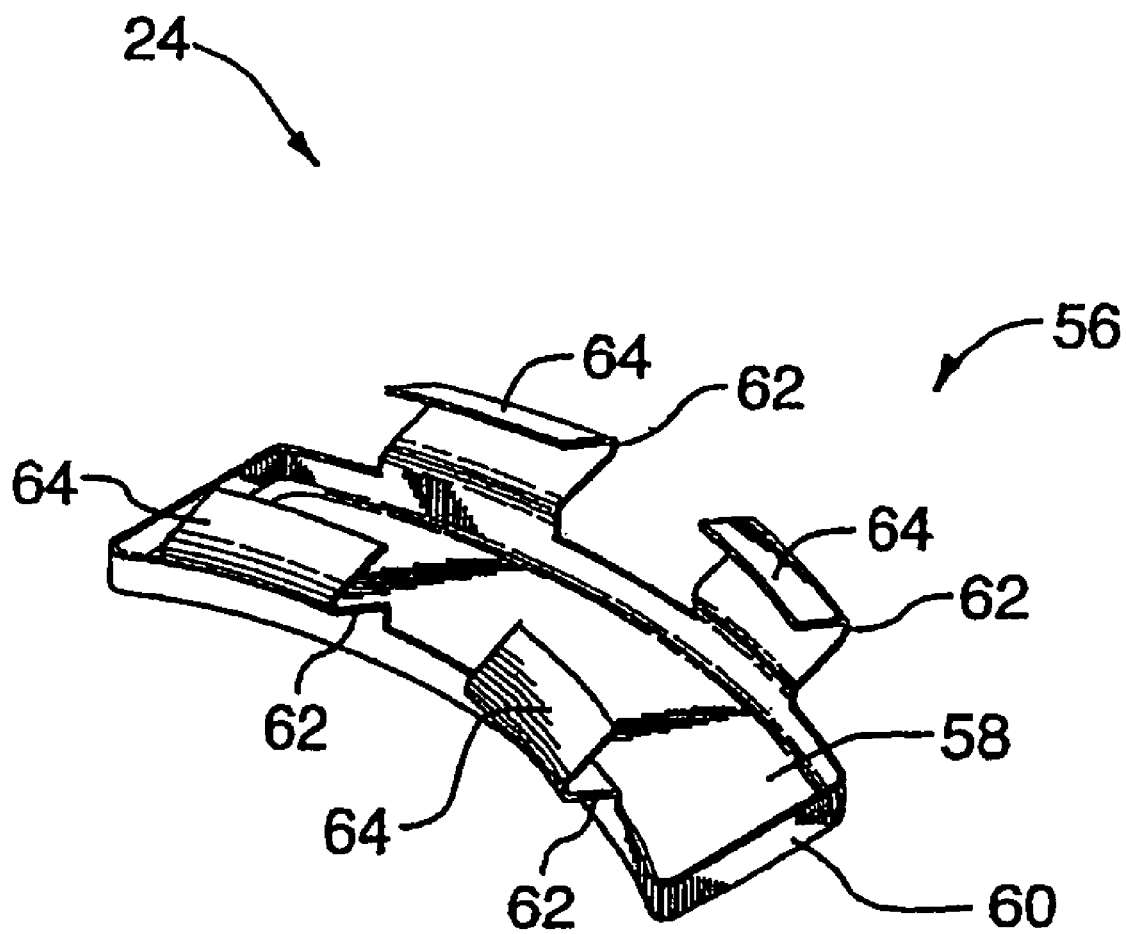
FIG. 3 is a perspective view of an insert according to a second preferred embodiment of the present invention, the insert being a component of the heat exchanger of FIG. 1.

Turning now to FIG. 3, the insert 24 includes a cradle 56. The cradle 56 comprises a base portion 58, a peripheral wall portion 60 and spaced-apart, resilient fingers 62. The peripheral wall portion 60 is dimensioned for disposition in sliding but snug-fitting relation within a respective annular ridge 38 in FIG. 2. The base portion 58 spans the peripheral wall portion 60, to check or block flow therethrough. The fingers 62 are four in number, although greater or lesser numbers can be employed, and extend outwardly from the peripheral wall portion 60 in opposed relation to one another. Each finger 62 has a V-shaped tab portion 64, the tab portion 64 having an apex that extends outwardly. Fingers 62 are resiliently deformable from an outwardly disposed arrangement as seen in FIGS. 2 and 3, to an inwardly deformable arrangement. In the inwardly deformable arrangement, the fingers 62 are compressed toward one another, such that the width of the insert 24 is smaller in dimension than the ports 48,50,54 and the apertures 30, so that insert 24 can pass therethrough. In the non-compressed or outwardly disposed arrangement, the fingers 62 extend outwardly, as shown in FIG. 3, such that the width of the insert 24 is larger in dimension than the ports 48,50,54 and the plate apertures 30, as described next below.

The foregoing structure permits the ready construction of heat exchangers having any desired number of passes from a common heat exchange element, merely by suitably positioning inserts 24 into the manifolds thereof. Such positioning of the inserts is conveniently effected by passing the inserts through a desired port 48,50,54 using a suitable tool (not shown), and then pushing the insert through the respective manifold to a desired depth. In this process, the fingers 62 are forced inwardly into their inwardly deformed arrangement as each port 48,50,54 or annular ridge 38 is passed by the V-shaped tab portions 64, and the fingers 62 spring or snap outwardly to their non-compressed or outwardly disposed arrangement with the V-shaped tabs 64 engaging opposed recesses 40 in the manifolds, to retain the insert in the location desired.

The heat exchanger of FIG. 2 is an example of a single pass heat exchanger constructed in this manner. As is evident, in this embodiment, a single insert 24 is provided. The peripheral wall portion 60 of such insert 24 is disposed in snug-fitting relation within an upper annular ridge 38 of manifold 34'. The insert 24, and more particularly, the base portion 58 thereof, thus stops or blocks flow from flow distribution passage 36' through port 50 when disposed in this terminal location in the manifold 34'. As will also be seen, as so positioned, the fingers 62 releasably engage the uppermost of the annular recesses or channels 40, to lock the insert 24 in this operative position. It will be understood that the portions of the annular recess 40 in which fingers 62 are located are considered to be opposed recesses for the purposes of this specification. Such opposing location of said recesses serves to lock the insert 24 against axial movement. Discrete opposed recesses (not shown) or sockets may be provided in the place of annular recesses 40, if desired. For example, if the base portion 58 of insert 24 was circular, it may be advantageous to provide discrete recesses for the fingers, to resist rotation of insert 24.

In use, oil from an engine block (or another heat exchange fluid) is received into manifold 34' through port 54 in the bottom plate 46. The insert 24 blocks flow through port 50. This forces oil introduced into manifold 34' to flow through oil passages 42. Oil exiting from the oil passages 42 is collected by manifold 34 and exits through aperture 48 in the top plate and into an oil filter, for example, and subsequent return through the central aperture 26 as mentioned above. It will be evident that a device with similar functionality could be obtained by omitting bottom plate 46, and fitting an additional insert in the lowermost position of manifold 34. Top plate 44 could also be omitted. As well, it should also be apparent that the device could function equally well if flow was reversed, that is, if flow was received from a filter or other device into manifold 34 via port 48. In such situation, the flow would flow through the oil passages 42, be collected in manifold 34', and then exit the heat exchanger through port 54.

Figure 4:
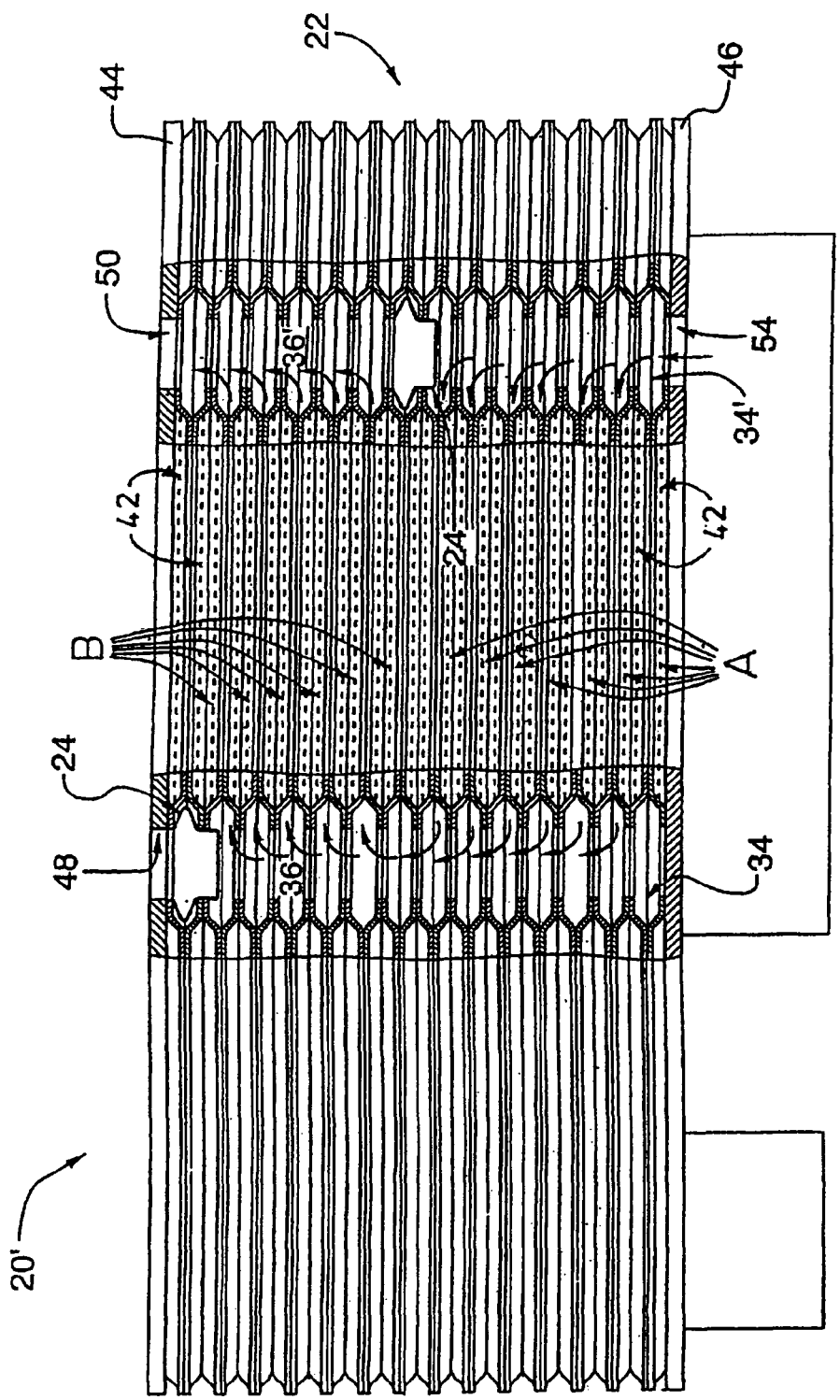
FIG. 4 is a view, similar to FIG. 2, of a heat exchanger according to a third preferred embodiment of the present invention.

FIG. 4 shows a two-pass heat exchanger 20'. In this heat exchanger 20', the heat exchange element 22 is identical to that provided in FIG. 2, but includes two inserts 24, disposed respectively at the upper end of manifold 34, and at an intermediate location in manifold 34'. The former insert 24 blocks flow through port 48. The latter insert 24 separates the plurality of oil passages 42 into two oil flow subpaths, A and B, as indicated in FIG. 4, which are connected in series to one another, each subpath A, B being composed of a group of oil passages 42 connected in parallel to one another. In use, oil is received into manifold 34' through port 54 and channeled by subpath "A" to manifold 34. From manifold 34, the oil is channeled back to manifold 34' by subpath "B", and then issues through port 50 in the top plate 44. Of course, flow patterns can be reversed herein as well, and the top plate and/or bottom plate can be omitted as discussed above.

Figure 5:
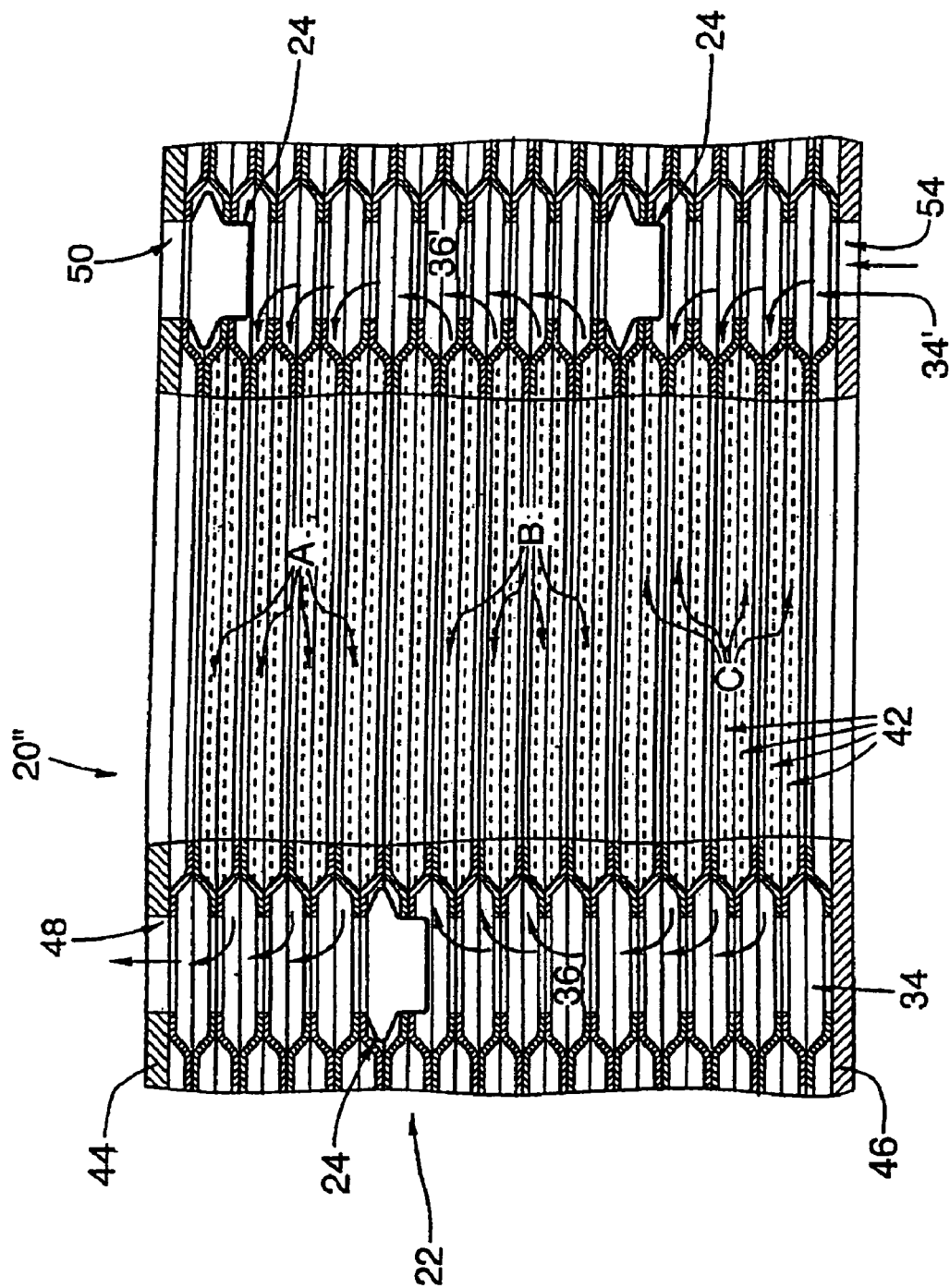
FIG. 5 is a view, similar to a portion of FIG. 2, of a heat exchanger according to a fourth preferred embodiment of the present invention.

FIG. 5 shows a three-pass heat exchanger 20". In this heat exchanger 20", the heat exchange element 22 is identical to that provided in FIG. 2, but includes three inserts 24, disposed respectively at the upper end of manifold 34', and at intermediate locations in manifolds 34 and 34'. The insert disposed at the upper end of manifold 34' blocks flow through port 50. The inserts 24 disposed at intermediate locations separate the plurality of oil passages 42 into three oil flow subpaths, A, B, C connected in series to one another, each subpath A, B, C being composed of a group of oil passages 42 connected in parallel to one another. In use, oil is received into manifold 34' through port 54 and channeled by subpath "C" to manifold 34. From manifold 34, the oil is channeled back to manifold 34' by subpath "B". Finally, oil received into manifold 34' from subpath "B" is channeled back to manifold 34 by subpath "A"/and ultimately issues through port 48 in top plate 44. Again, flow patterns can be reversed herein, and the top plate and/or bottom plate can be omitted as discussed above.

Figure 6:
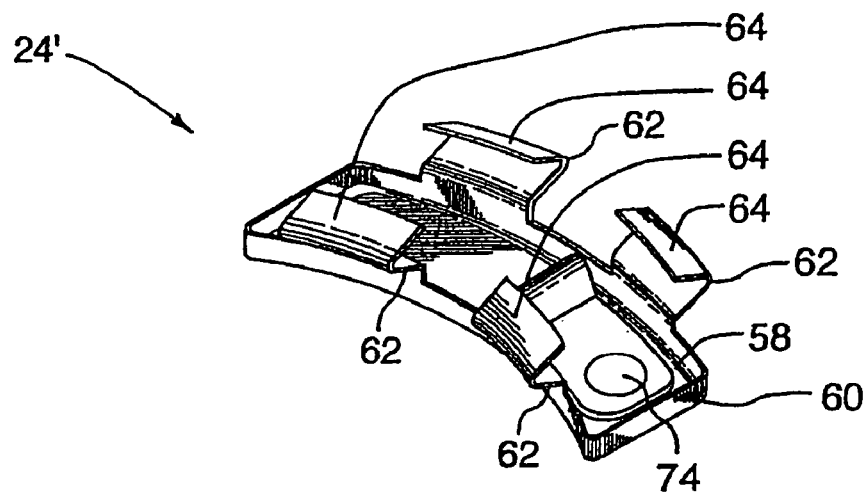
FIG. 6 is a perspective view, similar to FIG. 3, of an insert according to a fifth preferred embodiment of the present invention.
Figure 7:
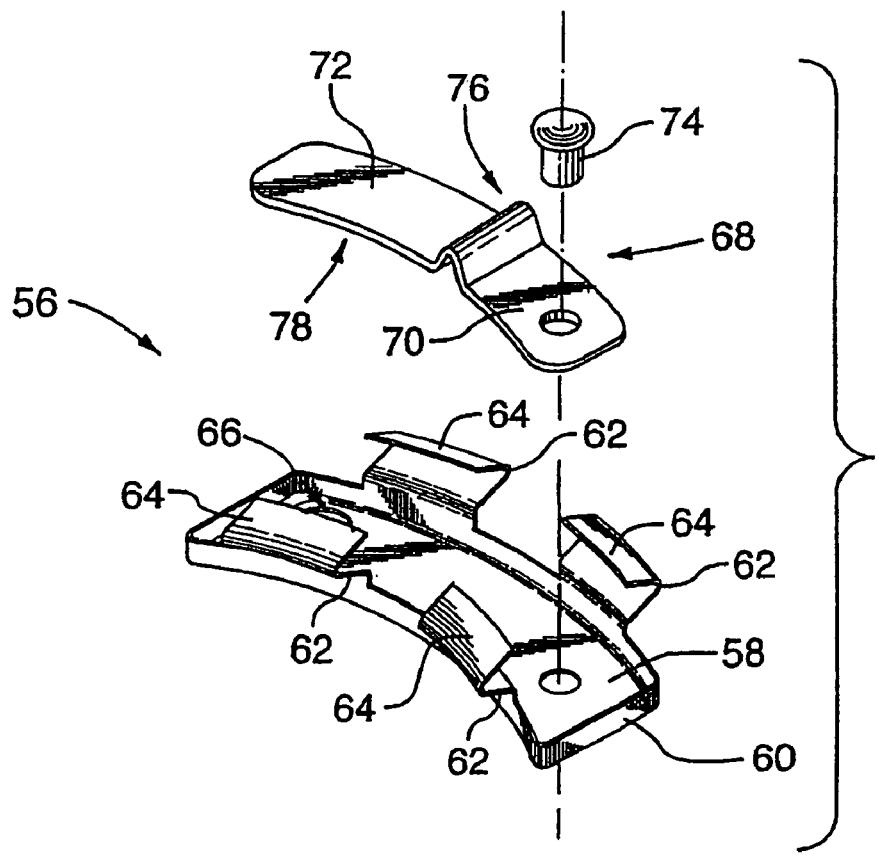
FIG. 7 is an exploded perspective view of the insert of FIG. 6.

Referring next to FIGS. 6 and 7, a modified insert 24' according to a fourth preferred embodiment of the present invention will next be described. FIG. 7 is an exploded view of the insert 24' of FIG. 6. This insert 24' is similar in structure to insert 24 (similar parts being identified with like reference numerals). However, in this insert 24', the base portion 58 defines a fluid port 66 to allow flow therethrough. Further, this insert 24' additionally includes a flapper 68. The flapper 68 preferably is stamped from spring steel and has a mounting part 70 and a resilient hinged tongue part 72. The mounting part 70 is secured to the cradle 56 by a standard rivet 74. The tongue part 72 extends away from the mounting part 70 and includes a transverse corrugation 76. Corrugation 76 is optional. The corrugation 76 helps to bias the flapper 68 to assume a fluid tight closed configuration, wherein the tongue part 72 is disposed at a closed position whereat it abuts and bears against the cradle base portion 58 to cover fluid port 66, as shown in FIG. 6. The tongue part 72 is dimensioned to restrict, and more specifically, substantially arrest flow through the fluid port 66 when the flapper 68 is so disposed. However, tongue part 72 can be shaped or dimensioned to restrict or block only a portion of fluid port 66 where it is desired to have some seepage or trickle flow through insert 24'. The tongue part 72 is movable by flexure of the tongue part 72 from the closed position at least partially closing fluid port 66, to an open position, whereat the tongue part 72 is spaced from the fluid port 66 to permit flow therethrough. Usually this occurs when in cold start-up conditions, where there is high fluid pressure on the underside of insert 24', but it could also occur if there is a pressure spike in the oil circuit unrelated to oil temperature. The closed and open positions of the tongue part 72 respectively define closed and open configurations of the flapper 68. Flapper 68 could also be made of bimetallic material, as described further below.

Inserts of this type can be deployed to great advantage. For example, an insert 24' of this type could be deployed in the structure of FIG. 2, in place of the insert 24 shown therein, and the spring bias of the flapper 68 could be selected to substantially arrest flow through the fluid port 66 in normal operating conditions, yet allow flow through fluid port 66 when the pressure drop across insert 24' exceeds a predetermined value. This would provide selective cold flow bypass of or through the heat exchanger 20. That is, in normal operating conditions, wherein relatively warm, substantially free-flowing oil is delivered to manifold 34', the spring constant of the flapper 68 would keep the tongue part 72 in its closed position against the base portion 58 to restrict, and more specifically, substantially arrest or stop flow through fluid port 66. Thus, most of the flow arriving at manifold 34' would pass in heat exchanging relation through the oil passages 42 to manifold 34 prior to passing through port 48. In contrast, in conditions such as cold start-up in relatively cold ambient conditions, wherein the oil is relatively cold, highly viscous oil is delivered to manifold 34'. In these circumstances, the flow resistance through the oil passages 42 is relatively high, with the result that the viscous oil would force the tongue part 72 to its open position, above the base portion 58, to permit flow from manifold 34' through port 50. That is, bypass flow would occur. The foregoing structure is of particular advantage, in that it obtains relatively high cooling performance in normal operating conditions, when cooling is needed, as substantially all oil passes through the heat exchange element. At the same time, the structure avoids starvation of mechanical components in normal transient high pressure conditions, such as cold weather start-up, and also avoids metal fatigue that can result from pressure spikes in the thin-wall plates forming the heat exchanger, since in such conditions bypass flow occurs.

As a further, non-limiting example, inserts 24' of this type could be deployed in the structure of FIG. 5, in place of the inserts 24 shown therein, with the spring bias of the flappers 68 thereof selected to provide sequential bypass. That is, in normal operating conditions, flow through the heat exchanger 20" would be as shown in FIG. 5, i.e. the oil flow would be forced sequentially through subpaths C, B, A. In slightly elevated pressure conditions, the flapper 68 of the uppermost insert in manifold 34' would open, thereby to permit a portion of the flow to bypass oil subpath A, i.e. such that all of the oil would be forced only through subpaths C, B, and very little, if any, would pass through subpath A. In moderately elevated pressure conditions, the flapper 68 of the insert in manifold 34 would also open, thereby to permit a portion of the flow to bypass oil subpath B i.e. all the oil would be forced only through subpath C, and very little, if any, would pass through subpaths B, A. In highly elevated pressure conditions, the flapper 68 of the lowermost insert in manifold 34' would further open, thereby to permit most, if not all, of the oil to bypass subpaths A, B, C, i.e. the oil would not be forced to flow through any high-resistance portion of the heat exchanger. This arrangement would tend to avoid pressure-related damage to the heat exchanger, while at the same time, maintaining heat transfer functionality except under conditions of very high pressure.

It will be appreciated that the more passes a heat exchanger has, the higher will be the heat transfer of the heat exchanger, but the pressure drop across the heat exchanger also increases with more passes. With the present invention, the heat transfer and pressure drop characteristics of the heat exchanger can be designed to suit end user needs, simply by modifying the characteristics of the inserts.

As yet a further alternative, the flappers 68 can take the form of a bimetallic strip or coil, adapted to move in response to temperature variations. For example, the bimetallic characteristics could be chosen to allow full bypass flow in cold start-up conditions, and gradually reduce the bypass flow as the oil heats up and becomes less viscous such as at normal operating conditions.

FIG. 8 shows a heat exchanger 20''' similar to the heat exchanger of FIG. 5. However, in this heat exchanger, modified inserts 24" with bimetallic strip flappers 80 are substituted for the inserts 24 disposed at intermediate positions in the manifolds 34,34'. As well, an insert 24' is substituted for the insert 24 disposed at the upper end of manifold 34', although this could be a bimetallic insert 24" as well. The bimetallic strip flappers 80 are constructed so as to assume the open configuration at temperatures significantly below normal operating conditions, and to assume the closed configuration at temperatures at or above normal operating conditions. This heat exchanger 20''' could have selective cold flow bypass characteristics, in that it could operate as a single-pass configuration in cold or below normal temperature flow conditions, as shown in FIG. 8, and switch automatically to a three-pass configuration (i.e. the flow pattern shown in FIG. 5) in normal or abnormally hot conditions. Of course, any configuration in between could be obtained by choosing the characteristics of the bimetallic flapper appropriately. Further, by mixing the inserts 24' and 24", heat exchanger 20''' could have both pressure responsive and temperature responsive characteristics, as desired.

Having described the preferred embodiments of the present invention, it will be appreciated that various modifications may be made to the structures described above without departing from the spirit or scope of the invention.

For example, whereas the present disclosure is directed largely to heat exchangers, it should be understood that the invention is not so limited. Inserts according to the present invention may be deployed in association with any fluid device defining a flow distribution passage and further defining a peripheral wall with opposed recesses that the insert can engage to be retained in position. The invention could, of course, be used with any type of fluids.

It will also be appreciated that other combinations of normally closed inserts 24 and inserts with bypass flappers 24' and inserts with bimetallic flappers 24" can be used to give a variety of flow configurations, in different operating conditions, inside the fluid devices.

Further, whereas the heat exchange element shown has a plurality of axially-spaced channels or opposed recesses, this need not be the case; the insert can be used with a heat exchanger having only one such channel or one pair or set of opposed recesses.

It should also be understood that whereas the disclosure illustrates and describes heat exchangers of generally similar construction, modifications therein are also contemplated to fall within the scope of the invention.

For example, the heat exchangers need not be formed of stacked plates, nor is it required that all or any of the various components be brazed to one another. The plates forming the heat exchanger could, for example, be made of other material, such as plastics, or they could be secured to one another with a suitable adhesive, such as epoxy. Tubes could be used instead of plate pairs to define some or all of the flow passages.

Further, whereas the flapper tongue parts illustrated in the preferred embodiments are substantially planar, it will be evident that this need not be the case, and any form of protuberance could be formed to fit, in whole or in part, in the fluid port 66.

As well, the construction of the flapper need not be limited to a single material. The mounting part could be made of a different material than that of the tongue part. Coatings could also be applied to assist in sealing, especially if the flapper is made of a weaker spring material.

If desired, the finger tab portions 64 could be lengthened a bit and holes formed in them, so the fingers could be gripped by a suitable tool (not shown). This would allow the fingers to be deformed inwardly by the tool so that the inserts 24 could be relocated or removed, as desired.

Finally, the insert can be located facing up, as described, or turned upside down, to suit the direction of flow through the heat exchanger or other fluid device with which it is used.

The invention claimed is:

1. A method of constructing a heat exchanger for use with a heat exchange fluid, the method comprising the steps of: providing a heat exchange element including: a pair of manifolds each having an axis; and a plurality of heat exchange flow passages extending between the manifolds for the passage of a heat exchange fluid through the heat exchange element, wherein one of said manifolds has a flow distribution passage defined by a peripheral wall having a longitudinally-spaced plurality of opposed recesses; providing an insert including a cradle dimensioned to be axially slidably located in the flow distribution passage, the cradle having oppositely-facing, resilient, spaced-apart fingers; and pushing the insert through the respective manifold to an operative position at a desired depth whereat the fingers engage said opposed recesses to retain the insert in said operative position to perform a flow baffling function.

2. A method according to claim 1, wherein the cradle includes a peripheral wall portion dimensioned to engage the peripheral wall of the flow distribution passage in snug-fitting relation when the insert is operatively positioned.

3. A method according to claim 2 wherein the cradle further includes a base portion spanning the peripheral wall portion.

4. A method according to claim 3 wherein the base portion defines a fluid port adapted to permit heat exchange fluid flow therethrough and thus through said flow distribution passage, and further comprising a flapper having a mounting part secured to the cradle and a resilient tongue part hingeably connected to the mounting part to be movable through flexure of the tongue part from a closed position at least partially closing the fluid port, to an open position, wherein the tongue part is spaced from the fluid port to permit flow through the fluid port.

5. A method according to claim 4 wherein the flapper is biased such that, in use, when the pressure drop across the fluid port is less than a predetermined value, the tongue part assumes the closed position such that flow through the fluid port is substantially arrested, and when the pressure drop across the fluid port corresponds to or exceeds the predetermined value, the tongue part assumes the open position to permit flow through the fluid port.

6. A method according to claim 4 wherein the flapper is stamped from spring steel and formed with a transverse corrugation adjacent to the mounting part.

7. A method according to claim 4 wherein at least the tongue part is bimetallic, so that the tongue part moves between the closed and open positions in response to temperature variations.

8. A method of constructing a heat exchanger for use with a heat exchange fluid, the method comprising the steps of: providing a heat exchange element including: a pair of manifolds each having an axis; and a plurality of heat exchange flow passages extending between the manifolds for the passage of a heat exchange fluid through the heat exchange element, wherein one of said manifolds has a flow distribution passage defined by a peripheral wall having a longitudinally-spaced plurality of opposed recesses; providing an insert including a cradle dimensioned to be axially slidably located in the flow distribution passage, the cradle having oppositely-facing, resilient, spaced-apart fingers; and pushing the insert through the respective manifold to an intermediate position in the manifold whereat the fingers engage said opposed recesses to retain the insert in said intermediate position to perform a flow baffling function.

9. A method according to claim 8, wherein the insert creates two flow paths in series in use.

* * * * *